(12) United States Patent
Horiguchi et al.

(10) Patent No.: US 12,554,386 B2
(45) Date of Patent: Feb. 17, 2026

(54) DISPLAY CONTROL DEVICE, NON-TRANSITORY COMPUTER-READABLE STORAGE MEDIUM, AND MONITOR DEVICE

(71) Applicant: Nihon Kohden Corporation, Tokyo (JP)

(72) Inventors: Daisuke Horiguchi, Tokorozawa (JP); Wataru Matsuzawa, Tokorozawa (JP); Mitsuhiro Oura, Tokorozawa (JP); Haruo Fujimoto, Tokorozawa (JP); Shinichi Sato, Tokorozawa (JP); Masashi Sato, Tokorozawa (JP)

(73) Assignee: Nihon Kohden Corporation, Tokyo (JP)

( * ) Notice: Subject to any disclaimer, the term of this patent is extended or adjusted under 35 U.S.C. 154(b) by 0 days.

(21) Appl. No.: 18/486,799

(22) Filed: Oct. 13, 2023

(65) Prior Publication Data

US 2024/0134509 A1    Apr. 25, 2024
US 2024/0231584 A9    Jul. 11, 2024

(30) Foreign Application Priority Data

Oct. 24, 2022  (JP) ................................ 2022-169901

(51) Int. Cl.
*G06F 3/048*     (2013.01)
*G06F 3/04845*   (2022.01)
*G06Q 10/0631*   (2023.01)

(52) U.S. Cl.
CPC .  *G06F 3/04845* (2013.01); *G06Q 10/063114* (2013.01)

(58) Field of Classification Search
None
See application file for complete search history.

(56) References Cited

U.S. PATENT DOCUMENTS

| 11,029,913 B1* | 6/2021 | Doyle, III | G16H 80/00 |
| 2013/0054272 A1* | 2/2013 | Rangadass | G16H 10/60 |
| | | | 705/3 |
| 2015/0302539 A1* | 10/2015 | Mazar | G08B 21/02 |
| | | | 705/3 |
| 2019/0199783 A1* | 6/2019 | Kelm | G06Q 30/0267 |
| 2019/0286844 A1 | 9/2019 | Gross | |
| 2019/0355447 A1* | 11/2019 | Barkol | G16H 80/00 |

FOREIGN PATENT DOCUMENTS

JP    2019525337 A    9/2019

\* cited by examiner

*Primary Examiner* — Thanh T Vu
(74) *Attorney, Agent, or Firm* — Dorsey & Whitney LLP (57) ABSTRACT

An input interface receives a trigger signal. A processor displays a first screen or a second screen on a display device based on the trigger signal. The first screen provides first medical information for each of a plurality of subjects. The second screen provides, for at least one of the plurality of subjects, second medical information that is not included in the first medical information.

17 Claims, 7 Drawing Sheets

DISPLAY CONTROL DEVICE, NON-TRANSITORY COMPUTER-READABLE STORAGE MEDIUM, AND MONITOR DEVICE

CROSS-REFERENCE TO RELATED APPLICATIONS

The present application claims the benefit of priority of Japanese Patent Application No. 2022-169901, filed on Oct. 24, 2022, the content of which is incorporated herein by reference.

TECHNICAL FIELD

The present disclosure relates to a device that controls display of medical information. The present disclosure also relates to a non-transitory computer-readable storage medium storing a computer program executable by a processor mounted on the device. The present disclosure also relates to a device that monitors the medical information.

BACKGROUND

A device for monitoring a subject at a medical clinical site is disclosed in JP2019-525337A. The device is configured to, when information for identifying an attribute of a medical worker is detected, change the information displayed on a display according to the attribute of the medical worker.

SUMMARY

There is a demand for a plurality of medical workers to support monitoring of a plurality of subjects.

A first aspect provided by the present disclosure is a display control device including:
 an interface configured to receive a trigger signal; and
 one or more processors configured to display a first screen or a second screen on a display device based on the trigger signal,
 wherein the first screen provides first medical information for each of a plurality of subjects, and
 wherein the second screen provides, for at least one of the plurality of subjects, second medical information that is not included in the first medical information.

A second aspect provided by the present disclosure is a non-transitory computer-readable storage medium storing a computer program executable by one or more processors mounted on a display control device, the computer program causes the display control device to execute:
 receive a trigger signal; and
 display a first screen or a second screen on a display device based on the trigger signal,
 wherein the first screen provides first medical information for each of a plurality of subjects, and
 wherein the second screen provides, for at least one of the plurality of subjects, second medical information that is not included in the first medical information.

A third aspect example provided by the present disclosure is a monitor device including:
 an interface configured to receive a trigger signal;
 a display device; and
 one or more processors configured to display a first screen or a second screen on the display device based on the trigger signal,
 wherein the first screen provides first medical information for each of a plurality of subjects, and
 wherein the second screen provides, for at least one of the plurality of subjects, second medical information that is not included in the first medical information.

Priority of information necessary for clinical determination at a medical site is different according to a duty of a medical worker. For example, a doctor who summarizes the entire site such as an attending doctor requires to grasp an overview of the site. On the other hand, a doctor in charge requires more detailed information on a pathological condition of the patient in charge. The nurse tends to be heavy in a reliable implementation of the ordered treatment. According to the configuration of each of the above aspects, since the first screen having a relatively high versatility and the second screen having a relatively high special property can be switched and displayed on a common display device, it is possible to quickly provide medical information according to a situation of each medical worker in a medical site where a plurality of subjects are monitored. Since both the degree of freedom of selection of the medical information and an aggregation property are enhanced, it is possible to support monitoring of a plurality of subjects by the plurality of medical workers.

DESCRIPTION OF EMBODIMENTS

An embodiment will be described in detail below with reference to the accompanying drawings.

The expression "at least one of A and B" used in the present specification with respect to two subjects such as A and B includes a case where only A is specified, a case where only B is specified, and a case where both A and B are specified. Each of A and B may be a single subject or a plurality of subjects unless otherwise specified.

The expression "at least one of A, B, and C" used in the present specification for three subjects such as A, B, and C includes a case where only A is specified, a case where only B is specified, a case where only C is specified, a case where A and B are specified, a case where B and C are specified, a case where A and C are specified, and a case where all of A, B, and C are specified. Each of A, B, and C may be a single subject or a plurality of subjects unless otherwise specified. The same applies to a case where there are four or more subjects to be described.

Figure 1:
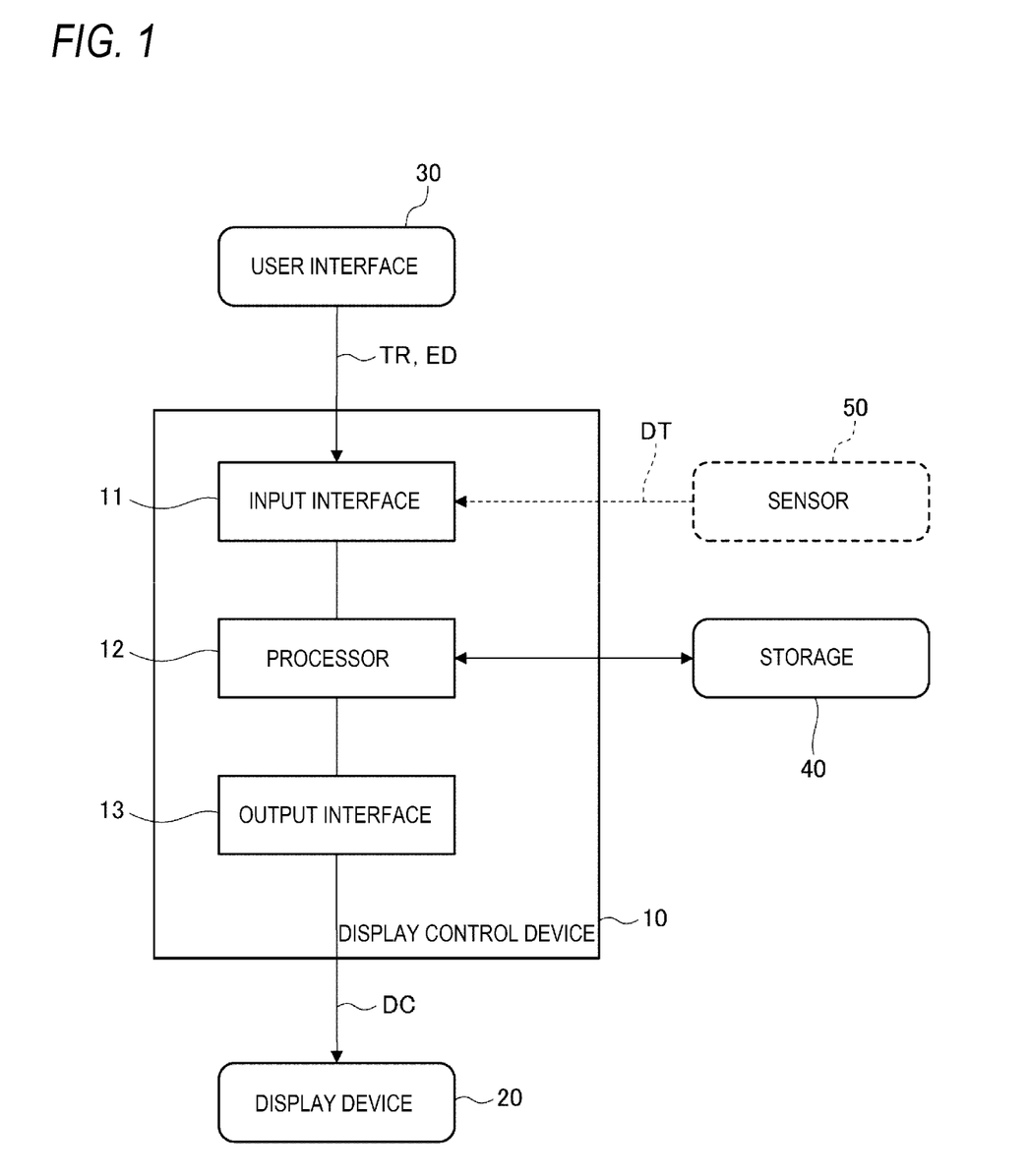
FIG. 1 illustrates a functional configuration of a display control device according to an embodiment.

FIG. 1 illustrates a functional configuration of a display control device 10 according to an embodiment. The display control device 10 is a device for controlling a display mode of medical information displayed on a display device 20.

The display control device 10 can include an input interface 11. The input interface 11 is configured as a hardware interface that receives a trigger signal TR output from a user interface 30. The trigger signal TR may be a digital signal or an analog signal depending on the specification of the user interface 30.

When the trigger signal TR is an analog signal, the input interface 11 can include an appropriate conversion circuit including an A/D converter. This description is similarly applied to other signals and data that can be received by the input interface 11 to be described later.

The display control device 10 can include a processor 12 and an output interface 13. The processor 12 is configured to output, from the output interface 13, a display control signal DC for causing the display device 20 to display either a first screen 21 or a second screen 22 based on the trigger signal TR. The first screen 21 and the second screen 22 will be described later.

The output interface 13 is configured as a hardware interface. The display control signal DC may be a digital signal or an analog signal depending on the specification of the display device 20.

When the display control signal DC is an analog signal, the output interface 13 includes an appropriate conversion circuit including a D/A converter. This description is similarly applied to other signals and data that can be output by the output interface 13 to be described later.

Figure 2:
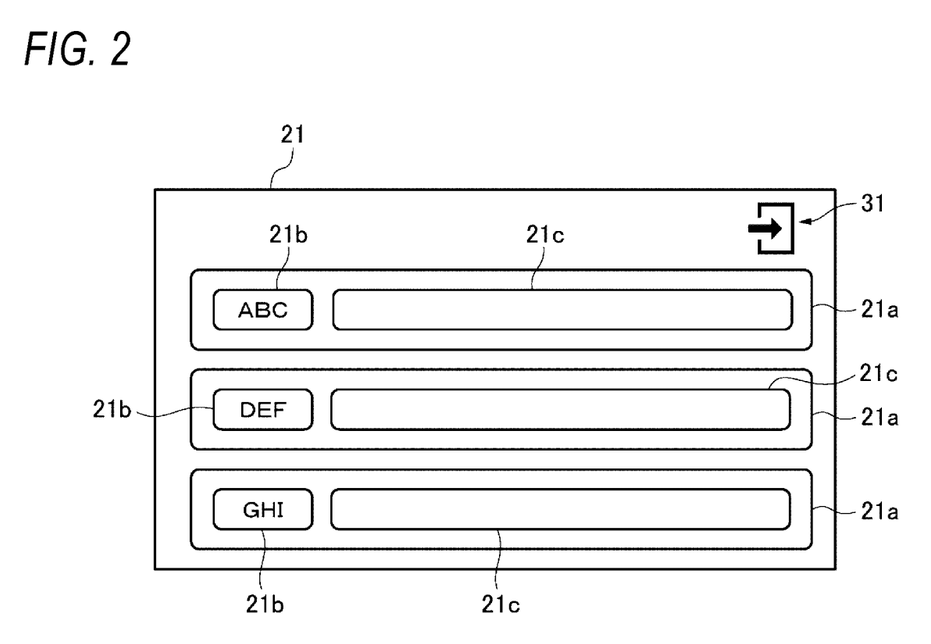
FIG. 2 illustrates an example of a first screen displayed on a display device of FIG. 1.

FIG. 2 illustrates an example of the first screen 21. The first screen 21 is a screen configured to provide first medical information for each of a plurality of subjects provided with medical care. The first screen 21 has a configuration in which the first screen 21 has a relatively high versatility and it is assumed that a subject who needs to refer to additional information is specified.

The first screen 21 can include a plurality of personal information display areas 21a. Each personal information display area 21a can include a personal specific area 21b and a medical information display area 21c.

The personal specific area 21b displays at least one of the name of the subject and identification information that can specify the subject.

The medical information display area 21c displays the first medical information on the subject specified by the information displayed in the personal specific area 21b. The first medical information includes at least one of attribute information of the subject, a vital sign of the subject, and a severity score of the subject.

Examples of the attribute information to be displayed include at least one of the following: a medical care department name, a primary doctor name, a disease name, an execution surgery name, an age, a gender, an admit date, an admit period, the number of days in a hospital, a scheduled discharge date, an admission route, the presence or absence of an allergy, the presence or absence of an infectious disease, and the presence or absence of an active treatment desire.

Examples of the vital sign to be displayed include a heart rate, a blood pressure, a transcutaneous arterial oxygen saturation (SpO2), a respiration rate, a body temperature, and a consciousness level.

The first medical information may additionally include at least one of the information listed below.
At least one of an examination result, and a name, an equipped period, and a target weaning schedule of a medical device attached to the subject;
at least one of a name, an administration period, and a target weaning schedule of a drug introduced to the subject at least one of a name, the start time, and the end time of a treatment bundle executed to the subject and a compliance status;
at least one of an execution rate of the examination, the measurement, the therapy, and the treatment, and the remaining time until the scheduled execution time;
a risk score.

Figure 3:
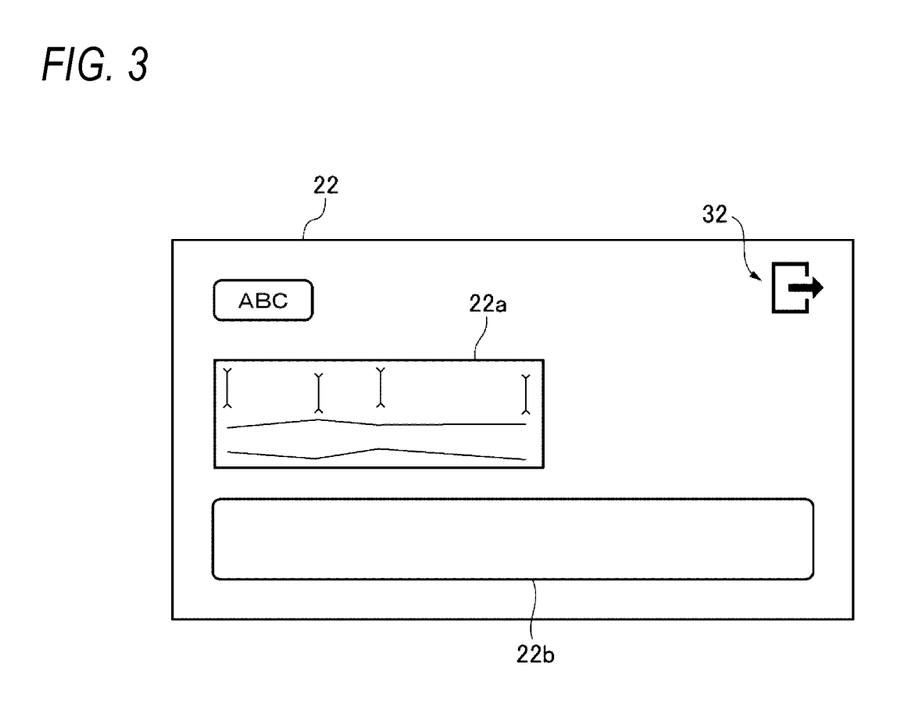
FIG. 3 illustrates an example of a second screen displayed on the display device of FIG. 1.

FIG. 3 illustrates an example of the second screen 22. The second screen 22 is a screen configured to provide second medical information to at least one of the plurality of subjects. The second medical information can include information that is not included in the first medical information. That is, the second screen 22 has a configuration in which the second screen 22 has a relatively high special property and it is assumed that additional information is referred to for at least one of a plurality of subjects.

In this example, the second screen 22 provides the second medical information for one subject specified by the identification information "ABC". The second screen 22 can include a history display area 22a and a medical information display area 22b.

The history display area 22a displays a temporal change in at least one vital sign acquired from the subject.

The medical information display area 22b mainly displays information that is assumed to be referred to by a nurse in charge of the subject. Examples of the information include a name of an examination or treatment to be periodically performed and an implementation status thereof, and a name of an instructed medication and an implementation status thereof.

As illustrated in FIG. 2, the first screen 21 displays a log-in button image 31 as an example of the user interface 30. When the log-in button image 31 is clicked or tapped, the trigger signal TR including information requesting transition to the second screen 22 is output. When the trigger signal TR is received by the input interface 11 of the display control device 10, the processor 12 outputs the display control signal DC for displaying the second screen 22 on the display device 20 from the output interface 13.

As illustrated in FIG. 3, the second screen 22 displays a log-out button image 32 as an example of the user interface 30. When the log-out button image 32 is clicked or tapped, the trigger signal TR including information requesting transition to the first screen 21 is output. When the trigger signal TR is received by the input interface 11 of the display control device 10, the processor 12 outputs the display control signal DC for displaying the first screen 21 on the display device 20 from the output interface 13.

Priority of information necessary for clinical determination at a medical site is different according to a duty of a medical worker. For example, a doctor who summarizes the entire site such as an attending doctor requires to grasp an overview of the site. On the other hand, a doctor in charge requires more detailed information on a pathological condition of the patient in charge. The nurse tends to be heavy in a reliable implementation of the ordered treatment. According to the configuration described above, since the first screen 21 having a relatively high versatility and the second screen 22 having a relatively high special property can be switched and displayed on a common display device 20, it is possible to quickly provide medical information according to a situation of each medical worker in a medical site where the plurality of subjects are monitored. Since both the degree of freedom of selection of the medical information and an aggregation property are enhanced, it is possible to support monitoring of a plurality of subjects by the plurality of medical workers.

Although not illustrated, a log-in screen for inputting the identification information of the medical worker can be displayed by operating the log-in button image 31 displayed on the first screen 21. When the medical worker inputs the identification information, the attribute information of the medical worker may be included in the trigger signal TR for displaying the second screen 22 on the display device 20.

The identification information of the medical worker may be stored in a portable card or tag. The identification information may be input by being read optically or magnetically or by being read through near field communication. Alternatively, the medical worker may be identified through biometric authentication.

The attribute information may include at least one of a name, a gender, an age, a medical care department name, an organization name, a duty, a professional position, a sickroom in charge, a patient in charge, a period of time since obtaining medical license, a period of time since being started working at a current hospital, a specialist skill, and qualification of acquisition.

Data specifying the second medical information displayed on the second screen 22 is stored in a storage 40 illustrated in FIG. 1 in association with the attribute information. The storage 40 is a storage device that may be realized by a semi-conductor memory, a hard disk device, a magnetic tape device, or the like.

The processor 12 reads the data specifying the second medical information associated with the attribute information included in the trigger signal TR from the storage 40, and outputs the display control signal DC for displaying the second medical information corresponding to the data on the second screen 22 of the display device 20 from the output interface 13. In other words, the processor 12 can change the second screen 22 (second medical information) displayed on the display device 20 based on the attribute information included in the trigger signal TR.

For example, when a nurse who is in charge of the subject specified by the identification information "ABC" displayed on the first screen 21 inputs his/her own identification information through the user interface 30, the trigger signal TR including the attribute information associated with the identification information is received by the input interface 11 of the display control device 10. The processor 12 outputs, from the output interface 13, the display control signal DC for causing the display device 20 to display the second screen 22 that specializes in the subject specified by the identification information "ABC" and provides the second medical information. Accordingly, the second screen 22 illustrated in FIG. 3 is displayed on the display device 20.

When another nurse who is in charge of the subject specified by identification information "DEF" displayed on the first screen 21 inputs his/her own identification information through the user interface 30, the trigger signal TR including the attribute information associated with the identification information is received by the input interface 11 of the display control device 10. The processor 12 outputs, from the output interface 13, the display control signal DC for causing the display device 20 to display the second screen 22 that specializes in the subject specified by the identification information "DEF" and provides the second medical information. As a result, the second screen 22 specialized in the reference by the nurse, which is different from that illustrated in FIG. 3, is displayed on the display device 20.

Figure 4:
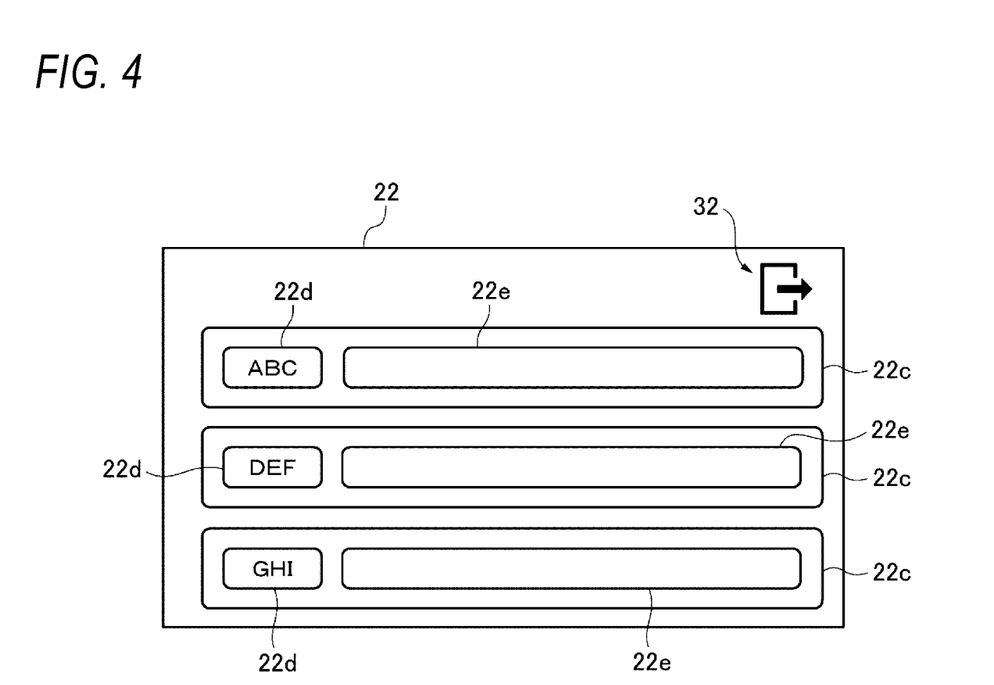
FIG. 4 illustrates another example of the second screen displayed on the display device of FIG. 1.

FIG. 4 illustrates another example of the second screen 22. The second screen 22 according to this example can include a plurality of personal information display areas 22c. Each personal information display area 22c can include a personal specific area 22d and a medical information display area 22e.

The personal specific area 22d displays at least one of the name of the subject and the identification information that can specify the subject.

The medical information display area 22e displays the second medical information on the subject specified by the information displayed in the personal specific area 22d. The second medical information can includes at least one of a disease name of the subject, a severity score of the subject, the name of the medical device attached to the subject, the scheduled exit date of the subject, the name of the nurse in charge of the subject, the attribute information of the nurse in charge of the subject, and the name of the doctor in charge of the subject. That is, the medical information display area 22e displays information that is assumed to be referred to by a head nurse or the like that controls a plurality of nurse.

When the head nurse inputs his/her own identification information through the user interface 30, the trigger signal TR including the attribute information associated with the identification information is received by the input interface 11 of the display control device 10. The processor 12 outputs, from the output interface 13, the display control signal DC for causing the display device 20 to display the second screen 22 that specializes in reference according to the head nurse and provides the second medical information. Accordingly, the second screen 22 illustrated in FIG. 4 is displayed on the display device 20. As for the head nurse, for example, a nursing care plan including an appropriate person arrangement of a nurse can be examined by comparing a disease name, a severity score, a period until leaving, and the like of each subject person with the attribute information of the nurse in charge.

Figure 5:
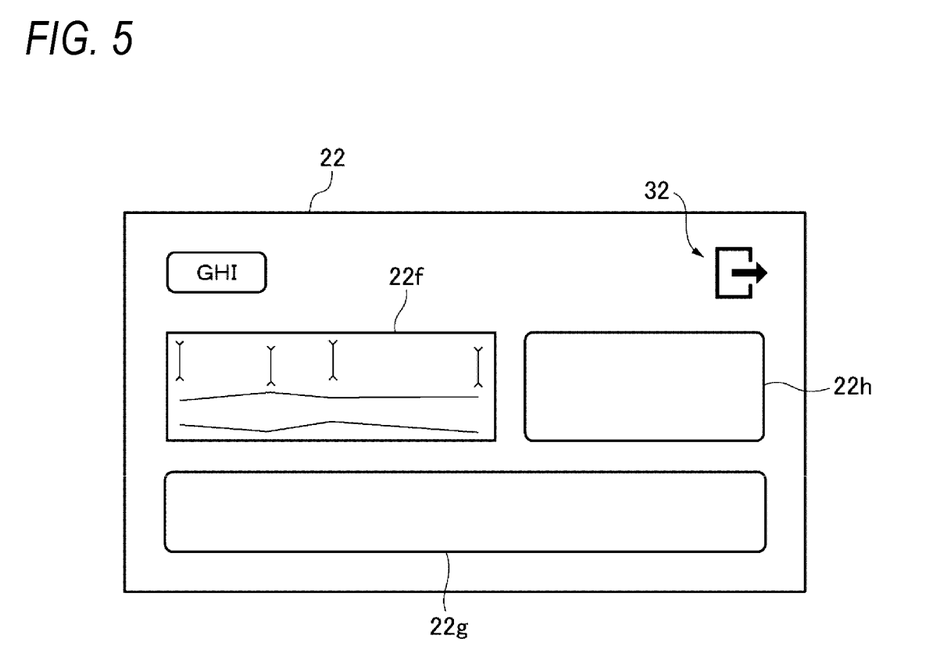
FIG. 5 illustrates still another example of the second screen displayed on the display device of FIG. 1.

FIG. 5 illustrates still another example of the second screen 22. In this example, the second screen 22 provides the second medical information for one subject specified by identification information "GHI". The second screen 22 can include a history display area 22f, a medical information display area 22g, and a determination support area 22h.

The history display area 22f displays a temporal change in at least one vital sign acquired from the subject.

The medical information display area 22g mainly displays information that is assumed to be referred to by the doctor in charge of the subject. Examples of the information include a result of an examination performed on the subject.

The determination support area 22h displays a graphical user interface (GUI) that is operated to switch a display screen necessary for determining a condition of the subject and perform an additional calculation process.

When the doctor who is in charge of the subject specified by the identification information "GHI" displayed on the first screen 21 inputs his/her own identification information through the user interface 30, the trigger signal TR including the attribute information associated with the identification information is received by the input interface 11 of the display control device 10. The processor 12 outputs, from the output interface 13, the display control signal DC for causing the display device 20 to display the second screen 22 that specializes in the subject specified by the identification information "GHI" and provides the second medical information. Accordingly, the second screen 22 illustrated in FIG. 5 is displayed on the display device 20. The doctor can refer to the second medical information displayed on the second screen 22, determine the condition of the subject, and consider a future treatment plan.

The second screen 22 suitable for reference by a team to which a plurality of medical workers belong may be provided. For example, a team supporting nutrient management can be provided with a surgery content, a scheduled hospitalization period, the most recent meal content, an instruction for the meal content, and the like as the second medical information. A team for which a rapid response is required can be provided with the severity score, the number of days in the hospital, an occurrence history of a severe event (cardiac arrest or the like), the presence or absence of desired resuscitation, and the like as the second medical information. A team in charge of respiratory care can be provided with the disease name, the scheduled hospitalization period, the number of equipped days of a respirator, setting of the respirator, and the like as the second medical information.

According to the configuration described above, by including the attribute information of the medical worker in the trigger signal TR, it is possible to display the second screen 22 that provides the second medical information suitable for the attribute of the medical worker (the duty, the subject in charge, or the like). Accordingly, after the transition from the first screen 21 to the second screen 22, it is possible to smoothly reach the information desired by the medical worker.

The display control device 10 may be configured such that a medical worker can edit a display mode of the second medical information on the second screen 22. The medical worker can input an instruction to add or delete an item of the second medical information displayed on the second screen 22 and to change a display layout of the second medical information on the second screen 22 through the user interface 30. The instruction may be included as information in the trigger signal TR.

In this case, as illustrated in FIG. 1, an editing signal ED corresponding to the change instruction is output from the user interface 30 and received by the input interface 11. The processor 12 outputs, from the output interface 13, the display control signal DC for causing the display device 20 to change the display mode of the second medical information included in the second screen 22 based on the editing signal ED.

By allowing customization of the second screen 22 in this manner, it is possible to more flexibly provide the second medical information according to the circumstances of each medical worker. Accordingly, after the transition from the first screen 21 to the second screen 22, it is possible to smoothly reach the information desired by the medical worker.

The processor 12 may readably store, in the storage 40, data for displaying the second medical information based on the changed display mode on the second screen 22.

According to such a configuration, the customized second screen 22 can be called as necessary, and thus convenience can be enhanced.

The processor 12 may be configured to output, from the output interface 13, the display control signal DC for displaying the first screen 21 on the display device 20 based on detection of the absence of the medical worker.

As an example, as illustrated in FIG. 1, a sensor 50 that detects that the medical worker is absent can be provided near the display device 20 or the user interface 30. The sensor 50 may be realized by a camera or a human sensor. The sensor 50 may be configured to output a detection signal DT when the absence of the medical worker is detected. In this case, when the detection signal DT is received by the input interface 11, the processor 12 may be configured to output the display control signal DC for displaying the first screen 21 on the display device 20 from the output interface 13.

In another example, the processor 12 may be configured to measure an elapsed time after receiving the trigger signal TR for displaying the second screen 22 on the display device 20. In this case, the processor may be configured to output the display control signal DC for displaying the first screen 21 on the display device 20 from the output interface 13 when the elapsed time exceeds a threshold value.

According to such a configuration, when the absence of the medical worker who has viewed the second screen 22 is detected, the transition to the first screen 21 can be automatically performed. In a case where it is not necessary to maintain the state of the display device 20 having a high special property due to some circumstances, the return to the state having a relatively high versatility is automatically performed, and thus convenience for the plurality of medical workers is easily maintained.

The processor 12 of the display control device 10 having the various functions described above may be realized by a general-purpose microprocessor that operates in cooperation with a general-purpose memory. Examples of the general-purpose microprocessor include a CPU, an MPU, and a GPU. Examples of the general-purpose memory include a ROM and a RAM. In this case, the ROM can store a computer program for realizing the function. The ROM is an example of a non-transitory computer readable medium that stores the computer program. The general-purpose microprocessor designates at least part of the programs stored in the ROM, loads the programs in the RAM, and executes the processing described above in cooperation with the RAM. The computer program may be pre-installed in the general-purpose memory, or may be downloaded from an external server device via a communication network and then installed in the general-purpose memory. In this case, the external server device is an example of the non-transitory computer readable medium that stores the computer program.

The processor 12 may be realized by a dedicated integrated circuit such as a microcontroller, an ASIC, or an FPGA capable of executing the computer program. In this case, the computer program is pre-installed in a storage element included in the dedicated integrated circuit. The storage element is an example of a computer-readable medium that stores a computer program. The processor 12 can also be realized by a combination of the general-purpose microprocessor and the dedicated integrated circuit.

Figure 6:
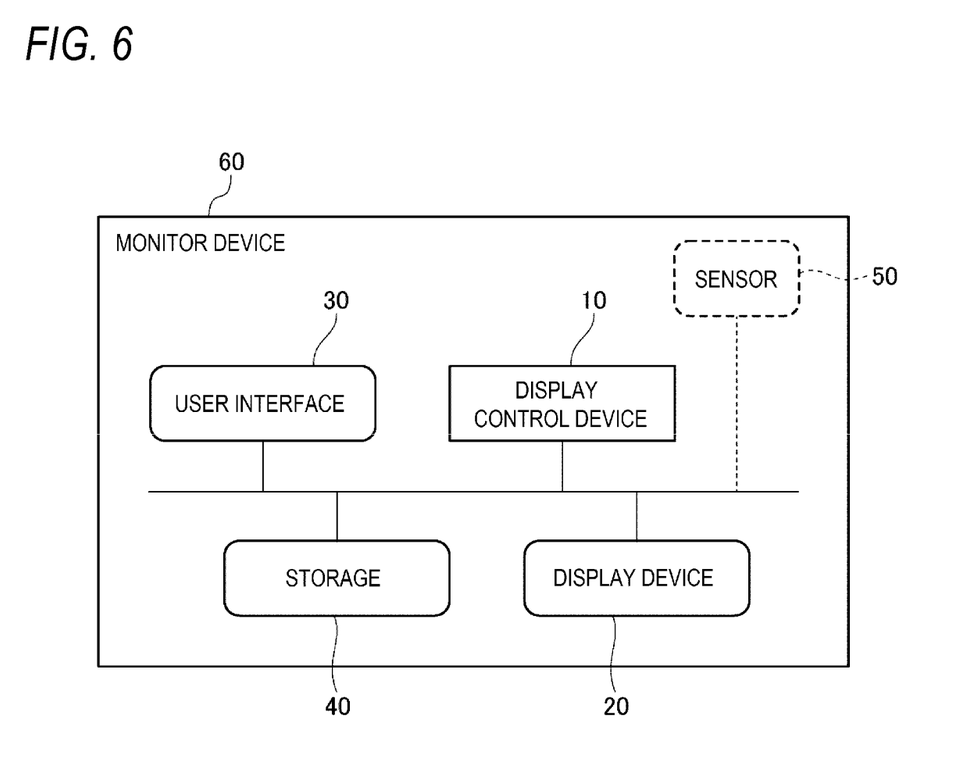
FIG. 6 illustrates an example of a display control system including the display control device of FIG. 1.

The display control device 10, the display device 20, the user interface 30, and the storage 40 described above may constitute a display control system in various modes. FIG. 6 illustrates an example in which all these elements are mounted on a single monitor device 60. The sensor 50 may also be mounted on the monitor device 60.

Figure 7:
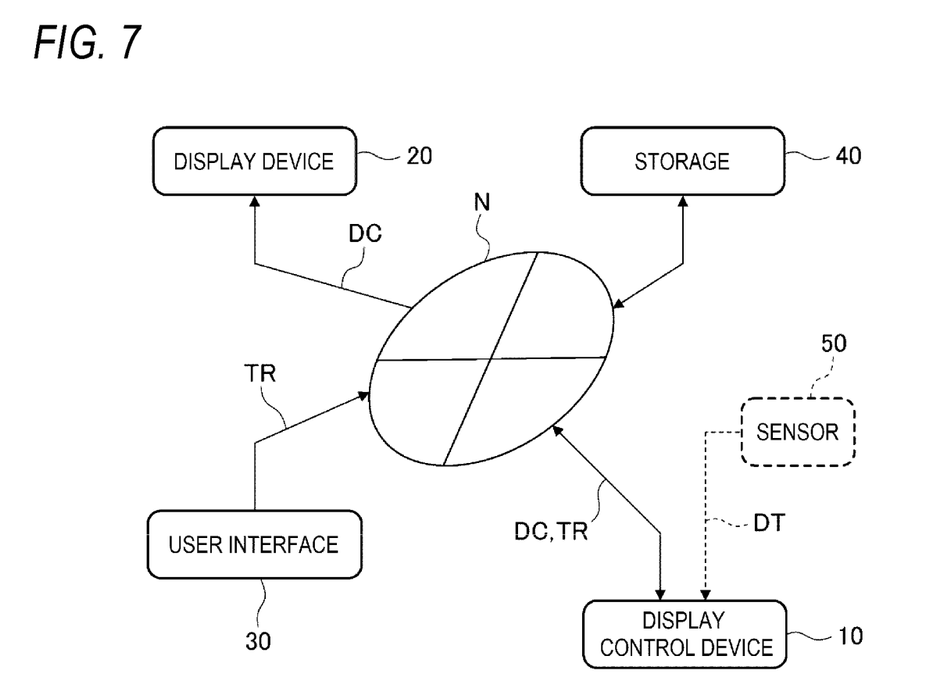
FIG. 7 illustrates another example of the display control system including the display control device of FIG. 1.

As illustrated in FIG. 7, at least one of the display device 20, the user interface 30, and the storage 40 can be communicably connected to the display control device 10 via a communication network N. That is, at least one of the display device 20, the user interface 30, and the storage 40 can be disposed on the communication network N independently of a device on which the display control device 10 is mounted.

At least two of the display device 20, the user interface 30, and the storage 40 may be a part of the same device. For example, a mobile terminal device that can be carried by the medical worker can provide functions of the display device 20 and the user interface 30.

The detection signal DT output from the sensor 50 may be directly input to the display control device 10 or may be input to the display control device 10 via the communication network N.

The various configurations described above are merely examples for facilitating the understanding of the present disclosure. The configuration examples may be appropriately changed or combined with other configuration examples.

The switching between the first screen 21 and the second screen 22 does not necessarily involve authentication of the medical worker. In this case, the user interface 30 may be configured to generate the trigger signal TR based on voice input or gesture input in addition to or instead of an operation of a changeover switch (including a switch image).

The configurations listed below also constitute a part of the present disclosure.

Item 1: A display control device including:
   an interface configured to receive a trigger signal; and
   one or more processors configured to display a first screen or a second screen on a display device based on the trigger signal,
   wherein the first screen provides first medical information for each of a plurality of subjects, and
   wherein the second screen provides, for at least one of the plurality of subjects, second medical information that is not included in the first medical information.

Item 2: The display control device according to Item 1,
   wherein the trigger signal for displaying the second screen on the display device includes attribute information of a medical worker, and
   wherein the one or more processors change the second medical information based on the attribute information.

Item 3: The display control device according to Item 1 or 2,
   wherein the interface receives an instruction to change a display mode of the second medical information included in the second screen, and
   wherein the one or more processors change the display mode of the second medical information included in the second screen based on the instruction.

Item 4: The display control device according to Item 3,
   wherein the one or more processors readably store, in a storage, data for displaying the second medical information based on the changed display mode on the second screen.

Item 5: The display control device according to any one of Items 1 to 4,
   wherein the one or more processors display the first screen on the display device based on detection of absence of a medical worker.

What is claimed is:

1. A display control device comprising:
   an interface configured as a hardware interface which receives a trigger signal; and
   one or more processors configured to display a first screen or a second screen on a display device based on the trigger signal,
   wherein the first screen provides first medical information for each of a plurality of subjects,
   wherein the second screen provides, for at least one of the plurality of subjects, second medical information that is not included in the first medical information,
   wherein the first screen displays the first medical information of the plurality of subjects within one screen, and
   wherein the one or more processors is further configured to:
      measure an elapsed time after receiving the trigger signal for displaying the second screen;
      display the first screen when the elapsed time exceeds a threshold value;
      identify attribute information of a medical worker;
      identify the second medical information of the at least one of the plurality of subjects based on the attribute information of the medical worker; and
      display the second screen providing the second medical information about the at least one of the plurality of subjects based on the attribute information of the medical worker.

2. The display control device according to claim 1,
   wherein the trigger signal for displaying the second screen on the display device includes attribute information of a medical worker, and
   wherein the one or more processors change the second medical information based on the attribute information.

3. The display control device according to claim 1,
   wherein the interface receives an instruction to change a display mode of the second medical information included in the second screen, and
   wherein the one or more processors change the display mode of the second medical information included in the second screen based on the instruction.

4. The display control device according to claim 3,
   wherein the one or more processors readably store, in a storage, data for displaying the second medical information based on the changed display mode on the second screen.

5. The display control device according to claim 1,
   wherein the one or more processors display the first screen on the display device based on a detection of absence of a medical worker.

6. The display control device according to claim 1,
   wherein the one or more processors read from a storage data specifying the second medical information associated with an attribute information included in the trigger signal, and display on the second screen the second medical information corresponding to the storage data.

7. A non-transitory computer-readable storage medium storing a computer program executable by one or more processors mounted on a display control device, the computer program causes the display control device to execute:
   receiving a trigger signal; and
   displaying a first screen or a second screen on a display device based on the trigger signal,
   wherein the first screen provides first medical information for each of a plurality of subjects,
   wherein the second screen provides, for at least one of the plurality of subjects, second medical information that is not included in the first medical information, and
   wherein the first screen displays the first medical information of the plurality of subjects within one screen,
   wherein the computer program is further configured to cause the display control device to execute:
   measuring an elapsed time after receiving the trigger signal for displaying the second screen;
   displaying the first screen when the elapsed time exceeds a threshold value;
   identify attribute information of a medical worker;

identify the second medical information of the at least one of the plurality of subjects based on the attribute information of the medical worker; and display the second screen providing the second medical information about the at least one of the plurality of subjects based on the attribute information of the medical worker.

8. The non-transitory computer-readable storage medium of claim 7, wherein the computer program causes the display control device to execute displaying the first screen on the display device based on a detection of absence of a medical worker.

9. The non-transitory computer-readable storage medium of claim 7, wherein the trigger signal for displaying the second screen on the display device includes attribute information of a medical worker, and wherein the one or more processors change the second medical information based on the attribute information.

10. A monitor device comprising:
an interface configured as a hardware interface which receives a trigger signal;
a display device; and
one or more processors configured to display a first screen or a second screen on the display device based on the trigger signal,
wherein the first screen provides first medical information for each of a plurality of subjects,
wherein the second screen provides, for at least one of the plurality of subjects, second medical information that is not included in the first medical information,
wherein the first screen displays the first medical information of the plurality of subjects within one screen,
wherein the one or more processors is further configured to:
measure an elapsed time after receiving the trigger signal for displaying the second screen;
display the first screen when the elapsed time exceeds a threshold value;
identify attribute information of a medical worker;
identify the second medical information of the at least one of the plurality of subjects based on the attribute information of the medical worker; and
display the second screen providing the second medical information about the at least one of the plurality of subjects based on the attribute information of the medical worker.

11. The monitor device of claim 10, wherein the one or more processors display the first screen on the display device based on a detection of absence of a medical worker.

12. The monitor device of claim 10, wherein the trigger signal for displaying the second screen on the display device includes attribute information of a medical worker, and wherein the one or more processors change the second medical information based on the attribute information.

13. A display control device comprising:
an interface configured as a hardware interface which receives a trigger signal; and
one or more processors configured to display a first screen or a second screen on a display device based on the trigger signal,
wherein the first screen provides first medical information for each of a plurality of subjects,
wherein the second screen provides, for at least one of the plurality of subjects, second medical information that is not included in the first medical information,
wherein the first screen displays the first medical information of the plurality of subjects within one screen, and
wherein the one or more processors is further configured to:
identify attribute information of a medical worker;
identify the at least one of the plurality of subjects based on the attribute information of the medical worker; and
display the second medical information about the at least one of the plurality of subjects based on the attribute information of the medical worker.

14. The display control device of claim 13, wherein the one or more processors is further configured to display the first screen on the display device based on a detection of absence of a medical worker.

15. The display control device of claim 13, wherein the trigger signal for displaying the second screen on the display device includes attribute information of a medical worker, and wherein the one or more processors change the second medical information based on the attribute information.

16. A display control device comprising:
an interface configured as a hardware interface which receives a trigger signal; and
one or more processors configured to display a first screen or a second screen on a display device based on the trigger signal,
wherein the first screen provides first medical information for each of a plurality of subjects,
wherein the second screen provides, for at least one of the plurality of subjects, second medical information that is not included in the first medical information,
wherein the first screen displays the first medical information of the plurality of subjects within one screen,
wherein the one or more processors display the first screen on the display device based on a detection of absence of a medical worker,
wherein the one or more processors identifies attribute information of a medical worker, identifies the second medical information of the at least one of the plurality of subjects based on the attribute information of the medical worker; and displays the second screen providing the second medical information about the at least one of the plurality of subjects based on the attribute information of the medical worker.

17. The display control device of claim 16, wherein the trigger signal for displaying the second screen on the display device includes attribute information of a medical worker, and wherein the one or more processors change the second medical information based on the attribute information.

* * * * *